United States Patent [19]

Mamrick et al.

[11] 3,775,723

[45] Nov. 27, 1973

[54] CIRCUIT PROTECTOR

[75] Inventors: Michael S. Mamrick, Hubbard; Cleothus Duncan, Jr., Youngstown, both of Ohio

[73] Assignee: General Motors Corporation, Detroit, Mich.

[22] Filed: Mar. 5, 1973

[21] Appl. No.: 338,024

[52] U.S. Cl. .................. 337/245, 337/187, 337/297
[51] Int. Cl. ........................................... H01h 85/58
[58] Field of Search .................. 337/228, 231, 232, 337/245, 246, 253, 254, 186, 216, 187, 297

[56] References Cited
UNITED STATES PATENTS

| 2,830,156 | 4/1958 | Burgess, Jr. .................. 337/246 X |
| 2,941,059 | 6/1960 | Sims et al. .................. 337/187 |

FOREIGN PATENTS OR APPLICATIONS

| 159,524 | 3/1921 | Great Britain .................. 337/245 |
| 21,642 | 12/1900 | Great Britain .................. 337/245 |
| 637,897 | 5/1928 | France .................. 337/245 |
| 1,813,430 | 12/1968 | Germany .................. 337/297 |

Primary Examiner—Roy N. Envall, Jr.
Attorney—W. S. Pettigrew et al.

[57] ABSTRACT

In a preferred form, this disclosure relates to an electric circuit protector comprising a body member made of an electrically insulating material and which is of a planar generally ractangular shape, a pair of spaced terminals carried by the body member, a metal fuse element having its opposite ends secured to the terminal, a cover means comprising a hollow cover shaped complementary with and in abutting engagement with one side of the body member to cover the rearward portion of the terminals and the fuse element and an outwardly extending handle integral with the cover to enable the circuit protector to be manually grasped, and cooperable means on the cover and the body member to retain the cover in place when positioned in abutting engagement with the body member.

3 Claims, 6 Drawing Figures

PATENTED NOV 27 1973

3,775,723

CIRCUIT PROTECTOR

The present invention relates to a circuit protector, and in particular, to a miniature size circuit protector for use in protecting electrical circuits for electrically operated components of automotive vehicles.

In automotive vehicles, the various electrical circuits for the electrically operated components thereof are protected by circuit protectors, commonly known as fuses. The circuit protectors include a fuse element which melts when an overload current is passed therethrough to interrupt the circuit for the component or components. This prevents any major damage to the electrical circuitry and adjacent electrically operated component or components in the circuitry. Most of the circuit protectors for the various electric circuits in automotive vehicles are commonly housed in a circuit protector or fuse block housing located on the inside of the firewall or adjacent the underside of the dashboard of the vehicle. With the advent of a greater number of electrically operated components in vehicles through the years, it has necessitated the use of a greater number of a circuit protectors and a larger housing or block to contain them.

The present invention provides a novel circuit protector which has the advantages of being miniature in size, which can be easily manually connected to and disconnected from the circuit protector housing, is economical to manufacture, and which can be made and assembled by automated machinery. The miniature size of the circuit protector enables a smaller circuit protector housing to be used or a greater number of circuit protectors to be used for a conventional sized housing.

Accordingly, it is a broad object of the present invention to provide a new and improved circuit protector which is miniature in size, which can be easily manually connected to and disconnected from a circuit protector housing for containing a plurality of circuit protectors, which is economical to manufacture, and which can be made and assembled by automated machinery.

Another object of the present invention is to provide a new and improved electric circuit protector comprising a generally planar rectangularly shaped body member made of electrically insulating material, a pair of spaced planar terminals carrier by the body member, a metal fuse element having its opposite ends secured to adjacent ends of the terminals and with the terminals and fuse elements being located in a space defined by the planes containing the external sides of the body member, a cover means comprising a hollow cover shaped complementary with and in abutting engagement with one side of the body member to cover the rearward portion of the terminals and fuse element and an outwardly extending handle integral with the cover to enable the circuit protector to be manually grasped, and cooperable means on the cover and body members to retain the cover in place when positioned over the fuse element and in abutting engagement with the body member.

Yet another object of the present invention is to provide a new and improved electric circuit protector, as defined in the next preceding object, and in which the cooperable means comprises a pair of recesses in the opposite sides of the body member and a pair of projecting fingers integral with the cover and which are received within the recesses and have their free ends bent over and heat staked in place against the opposite side of the body member.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawings forming a part of this specification and in which similar reference numerals or characters are employed to designate corresponding parts throughout the several views, and in which.

Figures 1, 2, 3, 4, 5, 6:
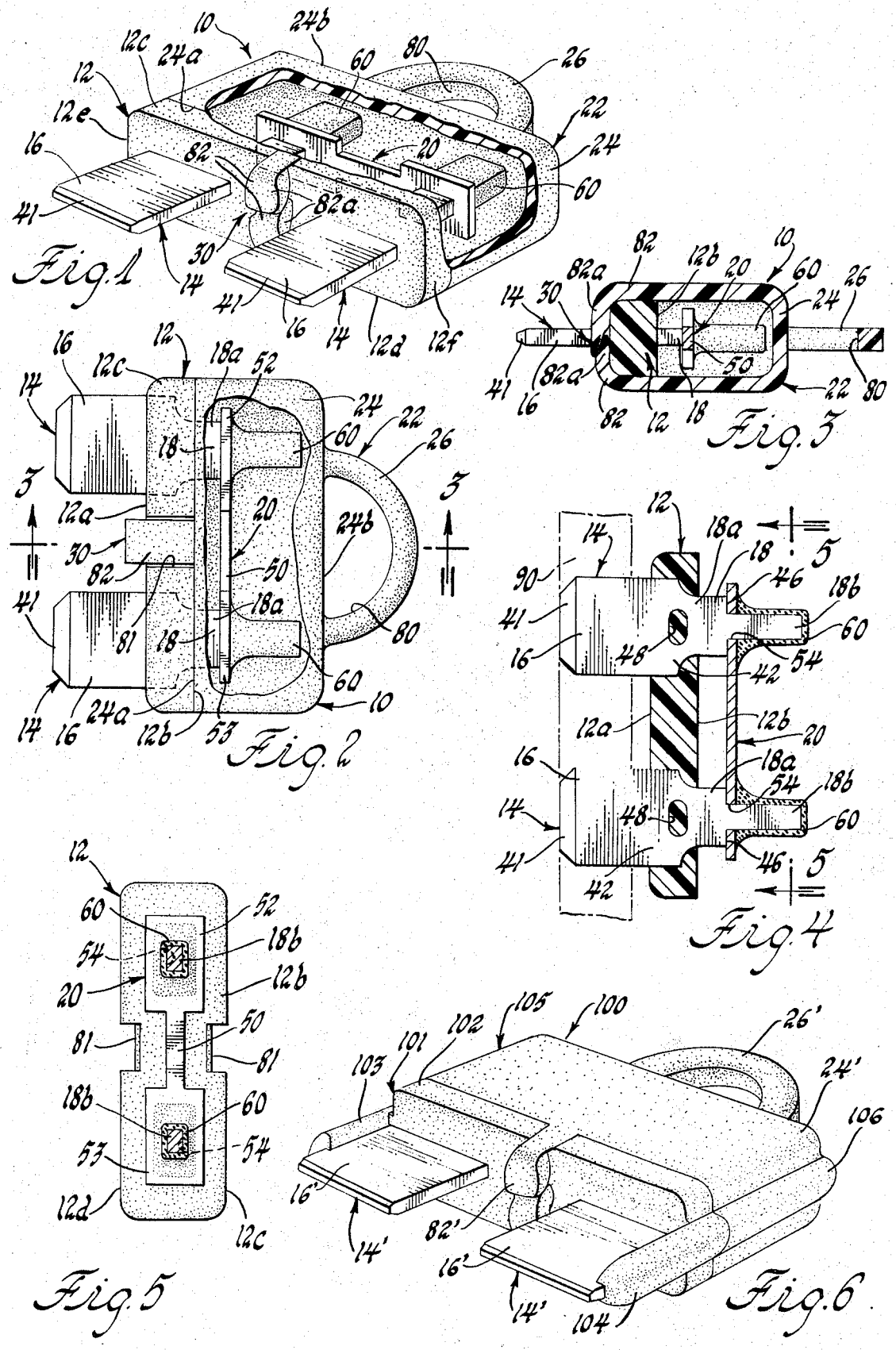
FIG. 1 is a perspective view of a preferred embodiment of a novel circuit protector of the present invention.
FIG. 2 is a top plan view of the novel circuit protector in FIG. 1.
FIG. 3 is a cross sectional view taken approximately along line 3—3 of FIG. 2.
FIG. 4 is a fragmentary sectional view with portions shown in elevation, of part of the novel circuit protector shown in FIG. 1.
FIG. 5 is a side elevational view of part of the circuit protector shown in FIG. 4 and looking in the direction of the arrows 5—5.
FIG. 6 is a perspective view of an alternate embodiment of a novel circuit protector of the present invention.

As representing a preferred embodiment of the present invention, FIGS. 1–5 of the drawings show a novel circuit protector 10. The circuit protector 10 broadly comprises a planar generally rectangularly shaped body member 12 made from an electrically insulating material, such as a suitable phenolic plastic material, a pair of spaced male terminals 14 carried by the body member 12 and each having a forward portion 16 projecting from one side of the body member which is adapted to be mated with a suitable female terminal and a rearward portion 18 projecting from the other side of the body member 12, a metal fuse element 20 which is secured at its opposite ends to the rearward portions 18 of the terminals 14, a cover means 22 including a hollow cover 24 which is shaped complementary with and disposed in abutting engagement with the other side of the body member 12 to cover the rearward portion of the terminals 14 and the fuse element 20 and an outwardly extending handle 26 integral with the cover 24 to enable the circuit protector to be manually grasped, and cooperable means 30 on the cover 24 and the body member 12 to retain the cover 24 in place on the body member 12.

The body member or main support portion 12 is planar and of a given thickness. The body member 12 has planar opposed sides 12a and 12b and planar top, bottom and lower and upper end surfaces 12c–12f, respectively.

The body member 12 carries the spaced terminals 14. The terminals 14 are embedded within the body member 12 midway between the upper and lower surfaces 12c and 12d. The terminals 14 are planar and made from a suitable metallic material. The terminals 14 include a forward flat blade portion 16 extending outwardly from the forward side 12a and having tapered forward ends 41, an intermediate portion 42 embedded within the body member 12 and a rearward portion 18 extending perpendicular to the rear side or surface 12b of the body member 12. The rearward portions 18 of the terminals 14 include a first section 18a adjacent the intermediate section 42 which is of a lesser width than the forward blade portions 16 and a rearward section 18b which is of a lesser width than the forward section 18a of the rearward portions 18. The forward and rearward sections 18a and 18b at their juncture define transversely extending abutment surfaces 46. The intermediate portion 42 has a width which progressively decreases proceeding from the forward portion 40 toward the rearward portion 18 and has a through opening 48 therein. The terminals 14 are embedded within the body member 12 during a molding operation and plastic material of the body member 12 flows through the opening 48 to securely retain the terminals 14 in place in the body member 12.

The rearward section 18b of the rearward portions 18 of the terminals 14 are adapted to receive the metal fuse element 20. The fuse element 20 has a narrow neck or fusable portion 50 between its opposite wider ends 52 and 53 and the ends 52 and 53 have rectangularly shaped openings 54 therethrough shaped complementary to the rearward sections 18b of the terminals 14. The fuse element 20 is made from a suitable or conventional metallic material such that the neck portion 50 will melt to break electrical continuity between the terminals 14 when a current in excess of a predetermined magnitude is passed therethrough. The fuse element 20 is adapted to be positioned onto the terminals 14 by having the rearward sections 18b received within the openings 54 until the opposite ends 52 and 53 engage the abutment surfaces 46. The fusable element 20 is adapted to be secured in place on the rearward sections 18b by soldering it thereto with a solder, as indicated by reference numeral 60. The rearward portions 18 and fuse element 20 lie wholly within a space defined by planes containing the external surfaces of the sides 12c and 12d and ends 12e and 12f.

The fusable element 20 is adapted to be covered to prevent dirt and other deleterious matter from coming into contact therewith by the cover means 22. The cover means 22 is either opaque or transparent plastic and comprises a hollow cover 24 which is open at one end 24a and closed at its other end 24b. The cover 24 is shaped complementary with the body member 12 and is therefore of a generally rectangular shape.

The hollow cover 24 is adapted to be positioned over the rearward portions 18 of the terminals 14 and the fusable element 20 until its end 24a abuttingly engages the backside 12b of the body member 12. The cover means 22 also includes an outwardly and arcuately extending handle 26 which is integral with the cover 24 at its closed end 24b and which defines therewith a generally semi-circular opening 80. The handle 26 enables the cover 24 to be manually grasped so that the circuit protector 10 can be readily connected to and disconnected from its mating female terminals in the fuse block (not shown).

The cover 24 is adapted to be secured to the body member 12 by the cooperable means 30. The cooperable means 30 comprises a pair of rectangularly shaped recesses 81 in the opposite sides 12c and 12d of the body member at a location intermediate the ends 12e and 12f and a pair of forwardly extending fingers 82 formed integral with the cover 24. The fingers 82 are adapted to be slidably received within the recesses 81 and their forward ends 82a are adapted to be bent over and heat staked in place against the front side 12a of the body member 12. Heating the ends 82a of the fingers 82 makes them plyable so that they can be bent over into overlapping engagement with each other and against the front side 12a. Except for the fingers 82, the cover member 24 is flush with the backside of the body member 12.

The advantages of the novel circuit protector 10 are that it is miniature in size, i.e., less than an inch square, it can be readily assembled to and disassembled from mating female terminals carried by the circuit protector housing or fuse block (not shown), it can be made economically and can be made and assembled by automated machinery, as noted below.

The method of making the novel circuit protector 10 comprises the following steps: a reel of sheet metal is passed through a suitable punch and die apparatus to punch out a carrier strip 90 and partial terminals 14 as shown by the phantom lines in FIG. 4. Thereafter, the terminals and carrier strip 90 are moved to a mold station wherein the plastic body member 12 is molded onto the terminal 14, as shown in FIG. 4. This partial assembly is then passed through another punch and die apparatus where the carrier strip portions between the blade portions 16 of the terminals 14 is punched out and removed to separate the finished terminal 14.

Then, the body member 12 and the terminals 14 are conveyed and fed via a hopper onto a work station where blanked out fuse elements 20 are fed and positioned onto the rearward sections 18b of the terminals until the fuse element 20 abuts the abutment surfaces 46. This assembly is then moved to another work station where a pair of rings of solder are placed over the fingers and then heated to melt the solder to form the solded connections between the ends 52 and 53 of the fuse element 20 and the terminals 14. Thereafter, the circuit protector 10 thus made is fed by hopper feed onto a machine where a previously molded cover with forwardly extending fingers 82 is placed over the fusable element 20 until the cover abuttingly engages the backside 12b of the body member 12. The fingers 82 are then heated and bent into overlapping engagement and against the forward side 12a of the body member 12 to connect or retain the cover 24 in place of the body member 12. The particular construction and arrangement of the novel circuit protector 10 is such that it lends itself very readily to automated assembly and thus, reduces the cost of manufacture.

FIG. 6 shows a second embodiment of a novel circuit breaker 100 of the present invention. The circuit breaker 100 is identical to the circuit breaker 10 except that a different body member 101 and cover means 105 are employed. The remaining parts of the circuit protector 90 are identical and will be given the same reference numeral, but with a prime affixed thereto.

The body member 101 of the circuit protector 100 is generally U-shaped and comprises a main, planar, rectangularly shaped support portion 102 and generally rectangularly shaped sidewall portions 103 and 104. In this embodiment, the terminals 14' are embedded in both the support wall portion 102 and the adjacent sidewall portion 103 and 104. This embodiment provides additional support for the forward blade portions 16' of the terminals 14' and eliminates the need to punch a hole like hole 48 in the terminals 14 to insure securement of the terminals to the body member. It also makes the forward portions 16' of the terminals 14' more rigid and less susceptible to bending.

The cover means 105 is identical to the cover means 22 except that it has additional ridges 106 on its opposite sides so as to be shaped complementary with the body member 101.

Although the illustrated embodiments hereof have been described in great detail, it should be apparent that certain modifications, changes, and adaptations may be made in the illustrated embodiments, and that it is intended to cover all such modifications, changes, and adaptations which come within the spirit of the present invention.

What is claimed is:

1. An electric circuit protector comprising:
   a body member made of electrically insulating material, said body member including a main support portion which is planar and of a generally rectangular shape,
   a pair of spaced metal terminals carried by said body member, said terminals each having a forward portion projecting from one side of said planar support portion and which is adapted to be mated with a mating terminal and a rearward portion projecting from the other side of said planar support portion,
   a metal fuse element secured adjacent one end to the rearward portion of one of the terminals and secured adjacent its other end to the rearward portion of the other terminal, said fuse element and said rearward portions of said terminals lying wholly within a space defined by planes passing through the external sides of said generally rectangularly shaped main support portion,
   a cover means comprising a hollow cover shaped complementary with and positioned in abutting engagement with the other side of said main support portion to cover the rearward portion of the terminals and said fuse element and an outwardly extending handle integral with the cover to enable the circuit protector to be manually grasped,
   and cooperable means on said cover and said body member to retain the cover in place when positioned in abutting engagement with the other side of said main support portion of said body member.

2. An electric circuit protector comprising:
   a body member made of electrically insulating material, said body member being planar and of a substantially rectangular shape,
   a pair of spaced terminals embedded within said body member, said terminals each having a forward planar blade portion projecting from one side of said body member and which is adapted to be mated with a mating female terminal and a rearward planar portion projecting from the other side of said body member,
   said rearward portions of said terminals comprising a first section adjacent the body member which is of a given width and a second section integral therewith which is of a lesser width to define transversely extending abutment surfaces at their juncture,
   a metal fuse element having first and second end portions and an intermediate portion of a narrower width than the end portions, said end portions having a through opening shaped complementary to the second sections of said rearward portion of said terminals, said end portions being slidably received on said second sections of said rearward portions until they abuttingly engage the abutment surfaces and being soldered to the rearward sections of the terminal,
   a cover means comprising a hollow cover shaped complementary with and in abutting engagement with the other side of the body member to cover the rearward portion of the terminal and the fuse element and an outwardly extending handle integral with the cover to enable the circuit protector to be manually grasped,
   and cooperable means on said cover and said body member to retain the cover in place relative to the body member, said cooperable means comprising a pair of recesses on the opposite sides of said body member and a pair of forwardly projecting fingers integral with the cover member and which are slidably received within the recesses and then bent over the one side of the body member by heat staking the fingers in place.

3. An electric circuit protector comprising:
   a U-shaped body member made of electrically insulating material, said body member having a planar main support portion and spaced side portions,
   a pair of spaced terminals embedded within said main support portion and partially embedded within an adjacent side portion of said body member, said terminals each having a forward planar blade portion projecting from one side of said main suport portion and which is adapted to be mated with a mating female terminal and a rearward planar portion projecting from the other side of said main support portion,
   said rearward portions of said terminals comprising a first section adjacent the body member which is of a given width and a second section integral therewith which is of a lesser width to define transversely extending abutment surfaces at their juncture,
   a metal fuse element having first and second end portions and an intermediate portion of a narrower width than the end portions, said end portions having a through opening shaped complementary to the second sections of said rearward portion of said terminals, said end portions being slidably received on said second sections of said rearward portions until they abuttingly engage the abutment surface and being soldered to the rearward sections of the terminal,
   a cover means comprising a hollow cover shaped complementary with and in abutting engagement with the other side of the body member to cover the rearward portion of the terminal and the fuse element and an outwardly extending handle integral with the cover to enable the circuit protector to be manually grasped,
   and cooperable means on said cover and said body member to retain the cover in place relative to the body member, said cooperable means comprising a pair of recesses on the opposite sides of said body member and a pair of forwardly projecting fingers integral with the cover member and which are slidably received within the recesses and then bent over the one side of the body member by heat staking the fingers in place.

* * * * *